US012698719B2

(12) United States Patent
Whyte

(10) Patent No.: US 12,698,719 B2
(45) Date of Patent: Aug. 4, 2026

(54) MOTOR COOLING SHROUD FOR FULLY REVERSIBLE TURBOMACHINERY

(71) Applicant: HOWDEN AXIAL FANS APS, Naestved (DK)

(72) Inventor: William Murray Whyte, Glasgow (GB)

(73) Assignee: HOWDEN AXIAL FANS APS, Naestved (DK)

( * ) Notice: Subject to any disclaimer, the term of this patent is extended or adjusted under 35 U.S.C. 154(b) by 66 days.

(21) Appl. No.: 18/885,987

(22) Filed: Sep. 16, 2024

(65) Prior Publication Data

US 2025/0035004 A1 Jan. 30, 2025

Related U.S. Application Data

(63) Continuation of application No. PCT/IB2022/053026, filed on Mar. 31, 2022.

(51) Int. Cl.

*F04D 19/00* (2006.01)
*F01D 7/00* (2006.01)
*F01D 25/12* (2006.01)

(52) U.S. Cl.

CPC ............... *F01D 7/00* (2013.01); *F01D 25/12* (2013.01); *F04D 19/005* (2013.01); *F05D 2260/20* (2013.01)

(58) Field of Classification Search

None

See application file for complete search history.

(56) References Cited

U.S. PATENT DOCUMENTS

| | | |
|---|---|---|
| 2,951,634 A | 9/1960 | Koch |
| 3,801,843 A | 4/1974 | Corman et al. |
| 6,891,290 B2 | 5/2005 | Nagayama et al. |

(Continued)

FOREIGN PATENT DOCUMENTS

| | | |
|---|---|---|
| GB | 2091947 B | 2/1985 |

OTHER PUBLICATIONS

Notification Concerning Transmittal of International Preliminary Report on Patentability including International Preliminary Report on Patentability for International Patent Application No. PCT/IB2022/053026 dated Oct. 10, 2024, 11 pages.

*Primary Examiner* — Courtney D Heinle
*Assistant Examiner* — Danielle M. Christensen
(74) *Attorney, Agent, or Firm* — Edell, Shapiro & Finnan, LLC

(57) ABSTRACT

A motor cooling shroud optimized for a fully reversible turbomachine where the motor cooling shroud improves the turbomachine's performance by efficiently controlling the cooling flow over a motor in both operating directions. The motor cooling shroud may be substantially cylindrical and may have a first end, an opposite second end, and a sidewall spanning between the first and second ends. The second end may define a central opening that is coaxial with a central axis of the fully reversible turbomachine. The sidewall may be configured to encircle a motor of the fully reversible turbomachine such that a motor cooling pathway is defined between the outer surface of the motor and the sidewall. At least one sidewall opening may be disposed in the sidewall proximate to the first end. A plate may be coupled to the second end such that the plate is spaced from the central opening.

20 Claims, 12 Drawing Sheets

(56) References Cited

U.S. PATENT DOCUMENTS

| | | | | |
|---|---|---|---|---|
| 7,459,817 | B2 | 12/2008 | VanLuik et al. | |
| 7,629,717 | B2 | 12/2009 | Kanei et al. | |
| 9,257,883 | B2 | 2/2016 | Büttner et al. | |
| 9,583,999 | B2 | 2/2017 | Higuchi | |
| 9,621,010 | B2 | 4/2017 | Stillger et al. | |
| 10,177,631 | B1 | 1/2019 | Castillo et al. | |
| 10,256,688 | B1 | 4/2019 | Castillo et al. | |
| 10,256,700 | B1 | 4/2019 | Castillo et al. | |
| 10,298,095 | B2 * | 5/2019 | Chou ....................... | H02K 9/06 |
| 10,505,421 | B2 | 12/2019 | Hopkins et al. | |
| 10,655,532 | B2 | 5/2020 | Jacob et al. | |
| 10,855,127 | B2 | 12/2020 | Hopkins et al. | |
| 10,910,909 | B2 | 2/2021 | Geissler et al. | |
| 11,056,942 | B2 | 7/2021 | Hopkins et al. | |
| 2008/0193275 | A1 | 8/2008 | De Filippis et al. | |
| 2014/0292122 | A1 | 10/2014 | Pal | |
| 2016/0197535 | A1 | 7/2016 | De Filippis et al. | |
| 2017/0033642 | A1 | 2/2017 | Chou | |
| 2019/0245398 | A1 | 8/2019 | Hopkins et al. | |
| 2021/0222704 | A1 | 7/2021 | Haag et al. | |
| 2021/0288536 | A1 | 9/2021 | Hopkins et al. | |

* cited by examiner

MOTOR COOLING SHROUD FOR FULLY REVERSIBLE TURBOMACHINERY

CROSS-REFERENCE TO RELATED APPLICATION

This application claims the priority under 35 U.S.C. § 120 to and the benefit of, and is a continuation application of, PCT Patent Application No. PCT/IB2022/053026, filed Mar. 31, 2022, entitled "Motor Cooling Shroud For Fully Reversible Turbomachinery", the entire disclosure of which is incorporated by reference herein in its entirety.

FIELD OF THE INVENTION

The present invention relates to turbomachinery, and, in particular, to a motor cooling shroud for fully reversible turbomachinery.

BACKGROUND OF THE INVENTION

Typically, turbomachinery are equipped with a specific type of electric motor known as a totally enclosed fan-cooled electric motor (hereinafter "TEFC motor"). The TEFC motor traditionally includes a designated cooling fan that is configured to provide a supply of outside air over the frame of the TEFC motor in order to cool it. The TEFC motor is most commonly used motor in ordinary industrial environments. However, in some applications, there is a requirement or need to equip turbomachinery with a motor without a designated cooling fan, and where the motor is cooled indirectly by the flow generated by the turbomachinery itself. These types of motors are typically known as a totally enclosed non-ventilated motor (hereinafter a "TENV motor").

When a motor is supplied without an integrated cooling fan (i.e., TENV motor), it is typically cooled by using air supplied by the turbomachinery itself. FIG. 1 shows a unidirectional operating turbomachine 100 with a TENV motor 110 exposed directly to the airstream that is generated by the impeller 120 of the turbomachine 100. As illustrated, the unidirectional operating turbomachine 100 further includes stators 130 that are disposed downstream from the impeller 120, and that are disposed about the TENV motor 110. The stators 130, however, are spaced from the TENV motor 110. While this arrangement is a conventional and cost-effective way of cooling the TENV motor 110, the disadvantage of this approach is that the stators 130 do not work optimally. Because the bottom ends of the stators 130 are spaced from the TENV motor 110, a leak path exists between the TENV motor 110 and the stators 130. This leak path results in a reduction in pressure static regain and, thus, a reduction in performance of the turbomachine 100. The disadvantages of type of arrangement are also present in fully reversible turbomachinery, like that illustrated in FIG. 2 and further explained below, not only because of the spacing between the bottom end of the stators and the motor, but because of the complexities resulting from the fully reversible turbomachine being operable to create a forward flow and a reverse flow.

It is known in the prior art to introduce a cover, tube, or hub over the TENV motor in order improve the static regain performance of the stators, where the stators on the rear side of the impeller maybe affixed to the hub in order to eliminates the gaps between the stators other structure components of the turbomachine, and to improve the performance of the turbomachine. However, when these prior art hubs are installed on fully reversible turbomachines, the total efficiency of the fully reversible turbomachine is adversely affected in at least one of the operating directions. For example, the prior art motor hubs may facilitate the fully reversible turbomachine to operate efficiently in the forward operating direction, but may result in an inefficient operation of the fully reversible turbomachine in the reverse operating direction due to the introduction of maldistributed flow immediately preceding the impeller and/or viscous losses in the cooling flow pathway due to relatively high cooling flow velocities. Conversely, if the flow is reduced to enable the motor hub to facilitate the efficient operation of the fully reversible turbomachine in the reverse operating direction, the cooling flow velocities in the forward operating direction are insufficient, and result in an inefficient operation in the forward operating direction.

Thus, what is needed is a motor cooling shroud for fully reversible turbomachinery that functions to create a sufficient motor cooling flow in both a forward operating direction and a reverse operating direction, without adversely affecting the efficiency of the fully reversible turbomachine in one of the operating directions.

SUMMARY OF THE INVENTION

The present invention is directed to a motor cooling shroud optimized for a fully reversible turbomachine where the motor cooling shroud improves the turbomachine's performance by efficiently controlling the cooling flow over a motor in both operating directions. The motor cooling shroud may be substantially cylindrical and may have a first end, an opposite second end, and a sidewall spanning between the first and second ends. The second end may define a central opening that is coaxial with a central axis of the fully reversible turbomachine. The sidewall may be configured to encircle a motor of the fully reversible turbomachine such that a motor cooling pathway is defined between the outer surface of the motor and the sidewall. At least one sidewall opening may be disposed in the sidewall proximate to the first end. A plate may be coupled to the second end such that the plate is spaced from the central opening. When the fully reversible turbomachine is equipped with the motor cooling shroud, a cooling pathway is formed between at least the inner surface of the sidewall of the motor cooling shroud and the outer surface of the motor encircled by the motor cooling shroud. When the fully reversible turbomachine operates in the forward operating direction, the at least one sidewall opening serves as an outlet to the cooling pathway and the central opening serves as an inlet of the cooling pathway. Thus, when the fully reversible turbomachine operates in the forward operating direction, the cooling flow is driven through the cooling flow pathway in a first direction from the central opening to the at least one sidewall opening. However, when the fully reversible turbomachine operates in the reverse operating direction, the at least one sidewall opening serves as an inlet to the cooling pathway and the central opening serves as an outlet of the cooling pathway. Thus, when the fully reversible turbomachine operates in the reverse operating direction, the cooling flow is driven through the cooling flow pathway in a second direction from the at least one sidewall opening to the central opening. The second direction of the cooling flow pathway is opposite of the first direction of the cooling flow pathway.

In one embodiment, a motor cooling shroud for a fully reversible turbomachine includes a first end, an opposite second end, and a sidewall spanning from the first end to the second end. The motor cooling shroud may further include a central opening disposed in the second end, and a plurality of sidewall openings disposed in the sidewall proximate to the first end. The central opening may be coaxial with a central axis of the fully reversible turbomachine. The sidewall may be configured to encircle a motor of the fully reversible turbomachine. The motor cooling shroud may further include a plate that is both coupled to the second end and spaced from the central opening.

In some instances of the motor cooling shroud, the plate may be disc-shaped. In some even further instances, the motor of the fully reversible turbomachine may be a totally enclosed non-ventilated motor. In even some further instances, the second end of the motor cooling shroud may contain a curved edge. The motor cooling shroud may contain, in some other instances, a plurality of guide vanes that extend from the sidewall of the motor cooling shroud at locations disposed between the plurality of sidewall openings and the central opening.

Moreover, in some instances, when the motor cooling shroud is disposed around the motor of the fully reversible turbomachine, one or more motor cooling pathways may be defined between an outer surface of the motor and the sidewall of the motor cooling shroud. When the fully reversible turbomachine operates in a forward direction, a first motor cooling flow generated by an impeller of the fully reversible turbomachine may flow through the one or more motor cooling pathways in a first direction. However, when the fully reversible turbomachine operates in a reverse direction, a second motor cooling flow generated by the impeller of the fully reversible turbomachine may flow through the one or more motor cooling pathways in a second direction that is opposite of the first direction.

In another embodiment, a fully reversible turbomachine may include an impeller, a motor, and a motor cooling shroud. The impeller may have a first side and an opposite second side. The motor may be operatively coupled to the second side of the impeller, where the motor may be configured to rotate the impeller in a first rotational direction and a second rotational direction. When the impeller rotates in the first rotation direction, the impeller generates a forward flow where the motor is downstream from the impeller. When the impeller rotates in the second rotational direction, the motor is upstream from the impeller. The motor cooling shroud may be disposed over the motor such that the motor cooling shroud and the motor define a motor cooling pathway. The motor rotating the impeller in the first rotational direction may generate a first motor cooling flow that flows through the motor cooling pathway in a first flow direction. In addition, when the motor rotating the impeller in the second rotational direction may generate a second motor cooling flow that flows through the motor cooling pathway in a second flow direction that is opposite of the first flow direction.

In some instances, the motor cooling shroud of the fully reversible turbomachine may be cylindrical. In addition, the motor cooling shroud may comprise a first end, a second end, and a sidewall. The first end may be disposed proximate to the impeller, while the second end may be opposite of the first end. The sidewall may extend between the first and second ends. The motor cooling shroud may further include a plurality of sidewall openings disposed within the sidewall proximate to the first end of the motor cooling shroud, and a central opening disposed within the second end of the motor cooling shroud. In some other instances, the motor cooling shroud may further include a disc-shaped plate coupled to the second end of the motor cooling shroud. The plate may have a first side surface that faces the second end of the motor cooling shroud and an opposite second side surface. The first side surface of the plate may be spaced from the second end of the motor cooling shroud. In some further instances, the motor cooling shroud may contain an interior mantel that may extend inwardly from the sidewall of the motor cooling shroud. The motor cooling pathway may be further defined between the interior mantel and an outer surface of the motor.

In yet another embodiment, a motor cooling shroud for a fully reversible turbomachine includes a first end, an opposite second end, and a sidewall spanning from the first end to the second end. The sidewall may be configured to encircle a motor of the fully reversible turbomachine and collectively define a motor cooling pathway with an outer surface of the motor. The motor cooling shroud may further include a central opening disposed in the second end that is coaxial with a central axis of the fully reversible turbomachinery. The motor cooling shroud may also include at least one sidewall opening disposed in the sidewall proximate to the first end. When the fully reversible turbomachine operates in a forward direction, the at least one sidewall opening serves as an outlet of the motor cooling pathway. Conversely, when the fully reversible turbomachine operates in a reverse direction, the at least one sidewall opening serves as an inlet of the motor cooling pathway.

In some further instances, the motor cooling shroud may include a disc-shaped plate coupled to the second end and spaced from the central opening. In some other instances, when the fully reversible turbomachine operates in the forward direction, the central opening may serve as the inlet of the motor cooling pathway. Conversely, when the fully reversible turbomachine operates in the reverse direction, the central opening may serve as the outlet of the motor cooling pathway. In some additional instances, the at least one sidewall opening may be a plurality of sidewall openings that are disposed within the sidewall and spaced equally around the sidewall proximate to the first end of the motor cooling shroud. In some even further instances, when the motor cooling shroud is disposed on the fully reversible turbomachine such that the motor cooling shroud encircles the motor of the fully reversible turbomachine, the first end of the motor cooling shroud may be disposed proximate to an impeller of the motor cooling shroud.

Figure 1:
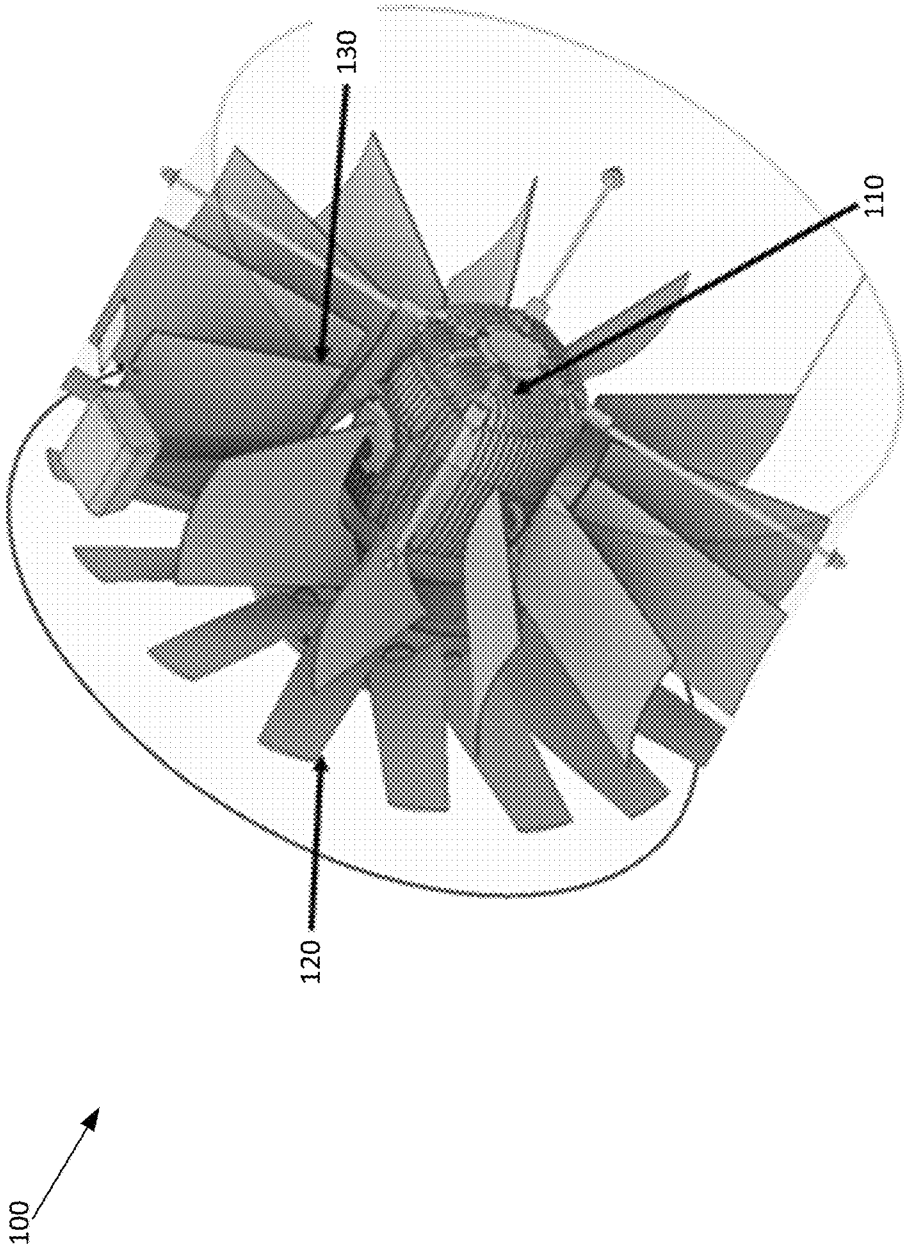
FIG. 1 PRIOR ART
FIG. 1 illustrates a perspective view of an example of a unidirectional turbomachine equipped with a TENV motor that does not contain a motor cooling shroud.

Like reference numerals have been used to identify like elements throughout this disclosure. It should be understood that the elements in the figures are not necessarily to scale and that emphasis has been placed upon illustrating the principles of the fully reversible fans and the motor cooling shroud.

DETAILED DESCRIPTION OF THE INVENTION

The present invention is directed to a motor cooling shroud that has been optimized for operation with fully reversible turbomachinery, where the motor cooling shroud efficiently and effectively draws a cooling flow over a TENV motor of the fully reversible turbomachinery from the main flow generated by impeller of the fully reversible turbomachinery. More specifically, the motor cooling shroud effectively cools the TENV motor of the fully reversible turbomachinery whether the turbomachinery is operating in the forward operating direction or the reverse operating direction, and does not cause the fully reversible turbomachinery to operate significantly less efficiently in one of the operating directions versus the other. As disclosed herein, a fully reversible turbomachine may be an axial fan with an impeller that includes a hub with a series of blades that are configured to rotate about a central axis of a flow pathway (i.e., duct, tunnel, tube, etc.). In other embodiments, the fully reversible turbomachine may be any other type of turbomachinery that is capable of operating in both a forward and reverse operation. Rotation of the impeller by the TENV motor may generate a flow of gas (e.g., air) that travels along the flow pathway. The TENV motor may be configured to rotate the impeller in a first rotational direction (e.g., a clockwise direction) to generate a flow of gas in a first flow direction through the turbomachine and in a second rotational direction (e.g., a counterclockwise direction), which is opposite of the first rotational direction, to generate a flow of gas in a second flow direction through the turbomachine. The second flow direction through the turbomachine may be opposite of that of the first flow direction.

The present invention of the motor cooling shroud may be substantially cylindrical and may have a first end, an opposite second end, and a sidewall spanning between the first and second ends. The second end may define a central opening that is coaxial with a central axis of the fully reversible turbomachine. The sidewall may be configured to encircle a motor of the fully reversible turbomachine such that a motor cooling pathway is defined between the outer surface of the motor and the sidewall. At least one sidewall opening may be disposed in the sidewall proximate to the first end. A plate may be coupled to the second end such that the plate is spaced from the central opening. When the fully reversible turbomachine is equipped with the motor cooling shroud, a cooling pathway is formed between at least the inner surface of the sidewall of the motor cooling shroud and the outer surface of the motor encircled by the motor cooling shroud. When the fully reversible turbomachine operates in the forward operating direction, the at least one sidewall opening serves as an outlet to the cooling pathway and the central opening serves as an inlet of the cooling pathway. Thus, when the fully reversible turbomachine operates in the forward operating direction, the cooling flow is driven through the cooling flow pathway in a first direction from the central opening to the at least one sidewall opening. However, when the fully reversible turbomachine operates in the reverse operating direction, the at least one sidewall opening serves as an inlet to the cooling pathway and the central opening serves as an outlet of the cooling pathway. Thus, when the fully reversible turbomachine operates in the reverse operating direction, the cooling flow is driven through the cooling flow pathway in a second direction from the at least one sidewall opening to the central opening. The second direction of the cooling flow pathway is opposite of the first direction of the cooling flow pathway.

As explained in further detail below, the present invention of the motor cooling shroud depicted herein eliminates the introduction of any maldistributed flow into the main flow of the fully reversible turbomachine, and especially into the main flow immediately before the main flow enters the impeller. Moreover, the motor cooling shroud depicted herein reduces the velocity of the cooling flow from the fully reversible turbomachine operating in the reverse operating direction to a range (i.e., a range in the same magnitude as the cooling flow from the fully reversible turbomachine operating in the forward operating direction) that more efficiently cools the TENV motor of the fully reversible turbomachine while reducing or eliminating viscous losses in the cooling flow pathway. The motor cooling shroud depicted herein not only improves the total efficiency of the fully reversible turbomachine operating in the reverse operating direction, but also improves total efficiency of the fully reversible turbomachine operating in the forward operating direction by delaying the boundary layer separation of the main flow from the diffusing section of the second end of the motor cooling shroud.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Illustrated in FIG. 1 is a unidirectional operating turbomachine 100 with a TENV motor 110 exposed directly to the airstream or flow generated by the impeller 120 of the turbomachine 100. As illustrated, the unidirectional operating turbomachine 100 further includes stators 130 that are disposed downstream from the impeller 120, and that are disposed about the TENV motor 110. The stators 130, however, are spaced from the TENV motor 110. As previously explained, because the bottom ends of the stators 130 are spaced from the TENV motor 110, a leak path exists between the TENV motor 110 and the stators 130. This leak path results in a reduction in pressure static regain and, thus, a reduction in performance of the turbomachine 100.

Figure 2:
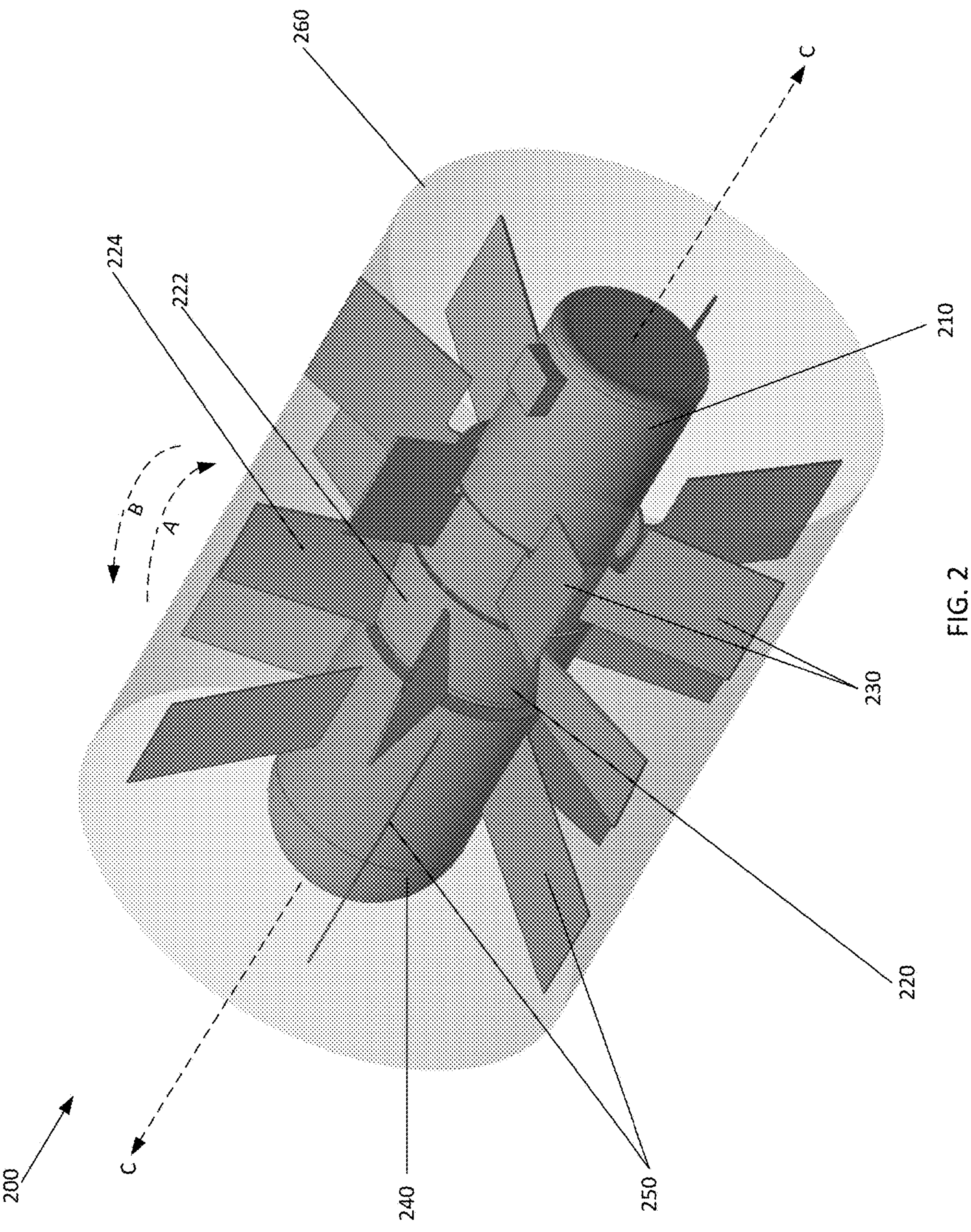
FIG. 2 PRIOR ART
FIG. 2 illustrates a perspective view of an example of a fully reversible fan equipped with a TENV motor that does not contain a motor cooling shroud.

As also previously explained, the disadvantages of the arrangement illustrated in FIG. 1 are also present in fully reversible turbomachinery, like that illustrated in FIG. 2. Like the unidirectional turbomachine 100, the fully reversible turbomachine 200 illustrated in FIG. 2 contains a TENV motor 210 operatively coupled to an impeller 220. The TENV motor 210, however, is configured to cause the impeller 220 to rotate in either a first rotational direction A (which is the forward operating direction configured to generate a flow in a forward or first direction in which the TENV motor 210 is downstream of the impeller 220) or a second direction B (which is the reverse operating direction configured to generate a flow in a reverse or second direction in which the TENV motor 210 is upstream of the impeller 220). The impeller 220 may include a central hub 222 and a series of impeller blades 224 extending radially from the central hub 222, and may be configured to rotate in either the first rotational direction A or the second rotational direction B about central axis C. The fully reversible turbomachine 200 further includes a series of stators 230 that are disposed downstream from the impeller 220 and disposed around the TENV motor 210. Like that of the stators 130 of the unidirectional turbomachine 100, portions of the bottom edges of the stators 230 are spaced from the TENV motor 210. As previously explained, this spacing creates a leak path between the stators 230 and the TENV motor 210 that results in a reduction in pressure static regain and, thus, a reduction in performance of the turbomachine 200.

Because the fully reversible turbomachine 200 is configured to operate in both a forward operating direction and a reverse operating direction, the fully reversible turbomachine 200 further includes a stationary hub 240 disposed on the side of the impeller 220 that is opposite of that of the TENV motor 210, which include a series of stators 250 extending radially from the stationary hub 240. The series of stators 230 disposed around the TENV motor 210 are configured to straighten the swirling or rotational flow coming from the impeller 220 when the impeller 220 is rotating in the first rotational direction A (i.e., when the fully reversible turbomachine 200 operating in the forward operating direction and the series of stators 230 are disposed downstream of the impeller 220). The series of stators 250 disposed around the stationary hub 240 are configured to straighten the swirling or rotational flow coming from the impeller 220 when the impeller 220 is rotating in the second rotational direction B (i.e., when the fully reversible turbomachine 200 is operating in the reverse operating direction and the series of stators 250 are disposed downstream of the impeller 220). FIG. 2 further illustrates the fully reversible turbomachine 200 disposed within a duct or enclosure 260.

Figure 3:
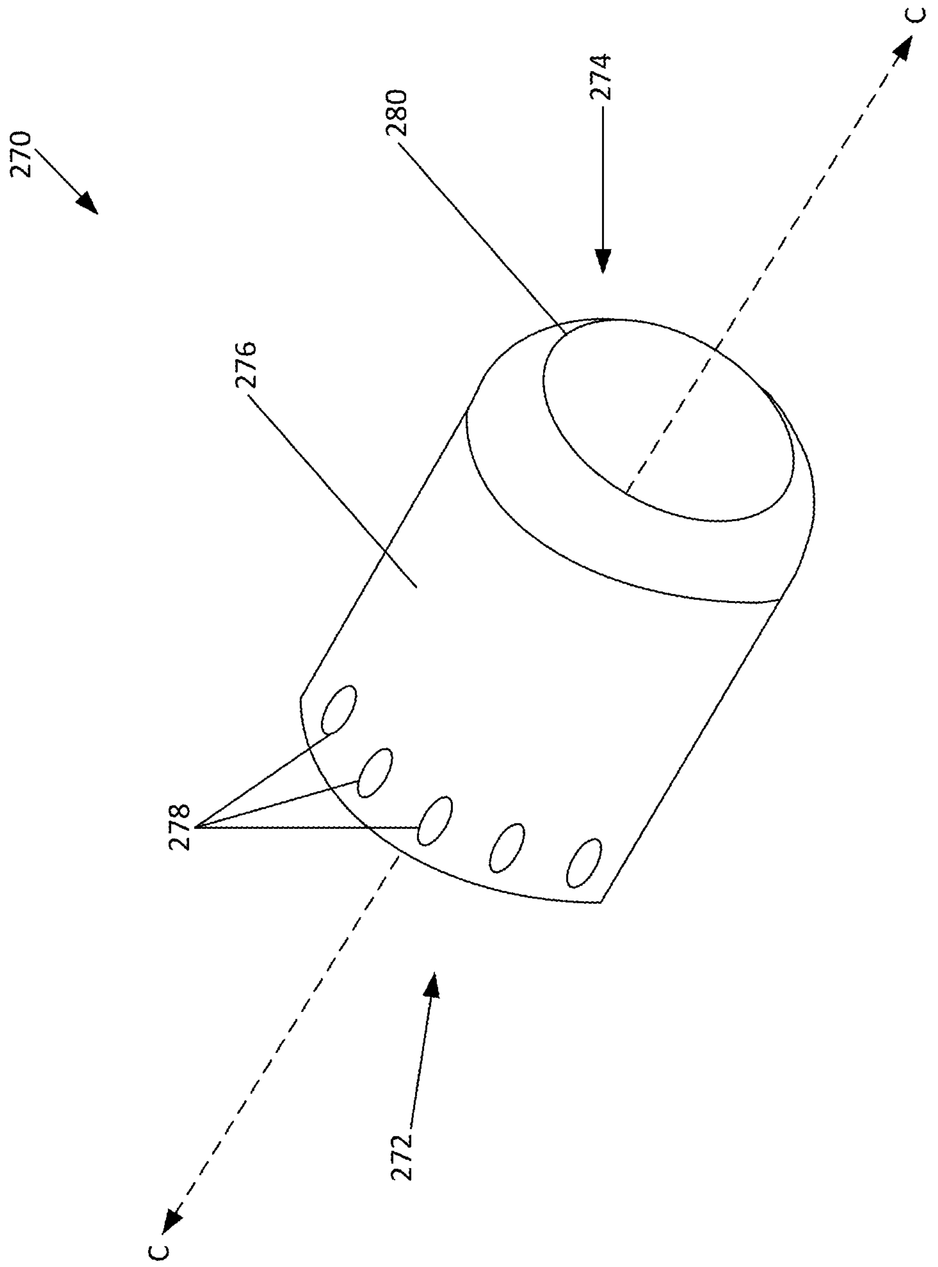
FIG. 3 PRIOR ART
FIG. 3 illustrates a perspective view of an example of a conventional motor hub configured to fit over the TENV motor of a unidirectional turbomachine or the TENV motor of a fully reversible turbomachine.
Figure 4A:
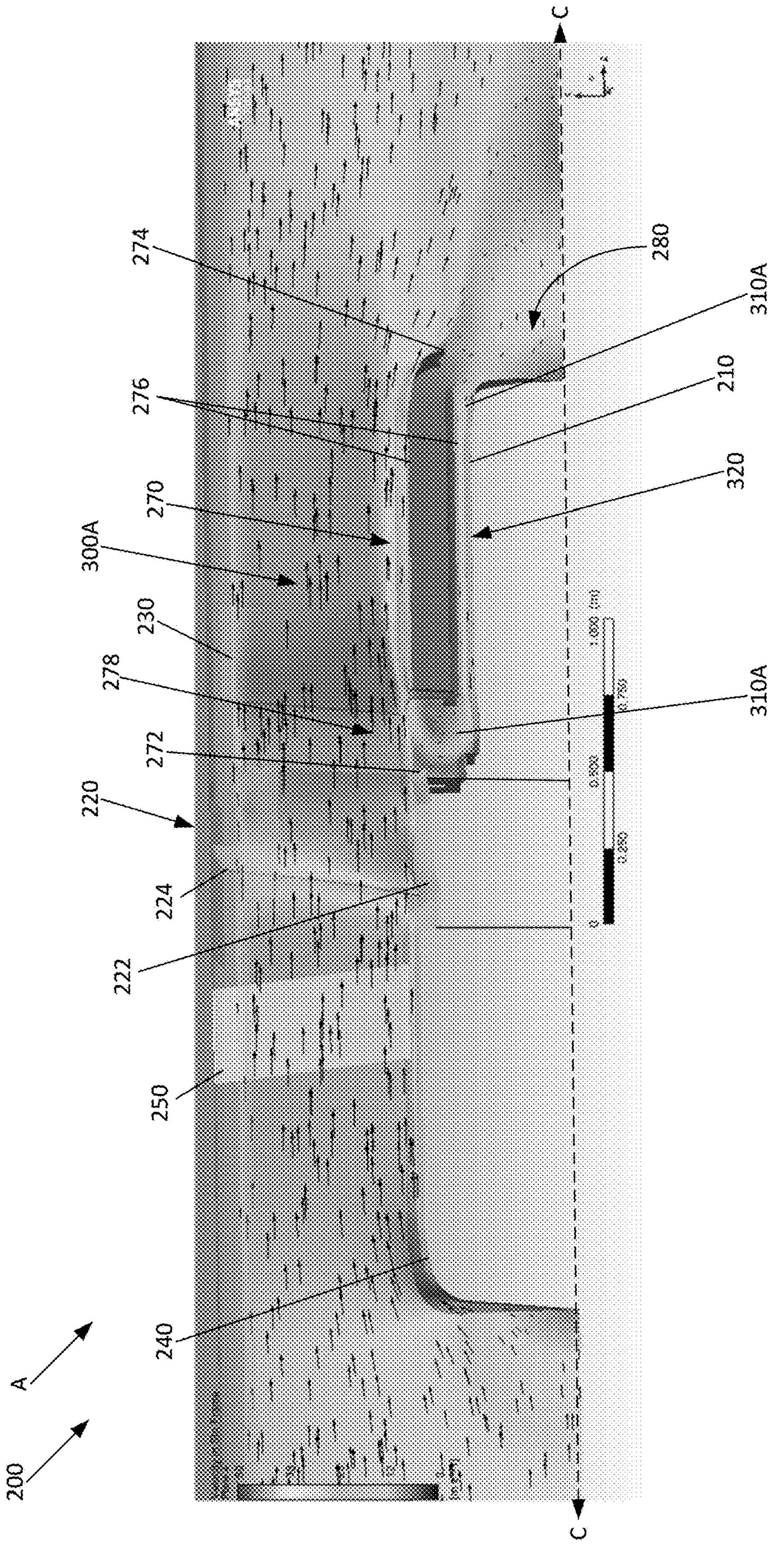
FIG. 4A PRIOR ART
FIG. 4A illustrates a computational fluid dynamics simulation of the flow of a fully reversible fan equipped with a TENV motor and a prior art motor cooling hood, the fully reversible fan operating in a forward direction.
Figure 4B:
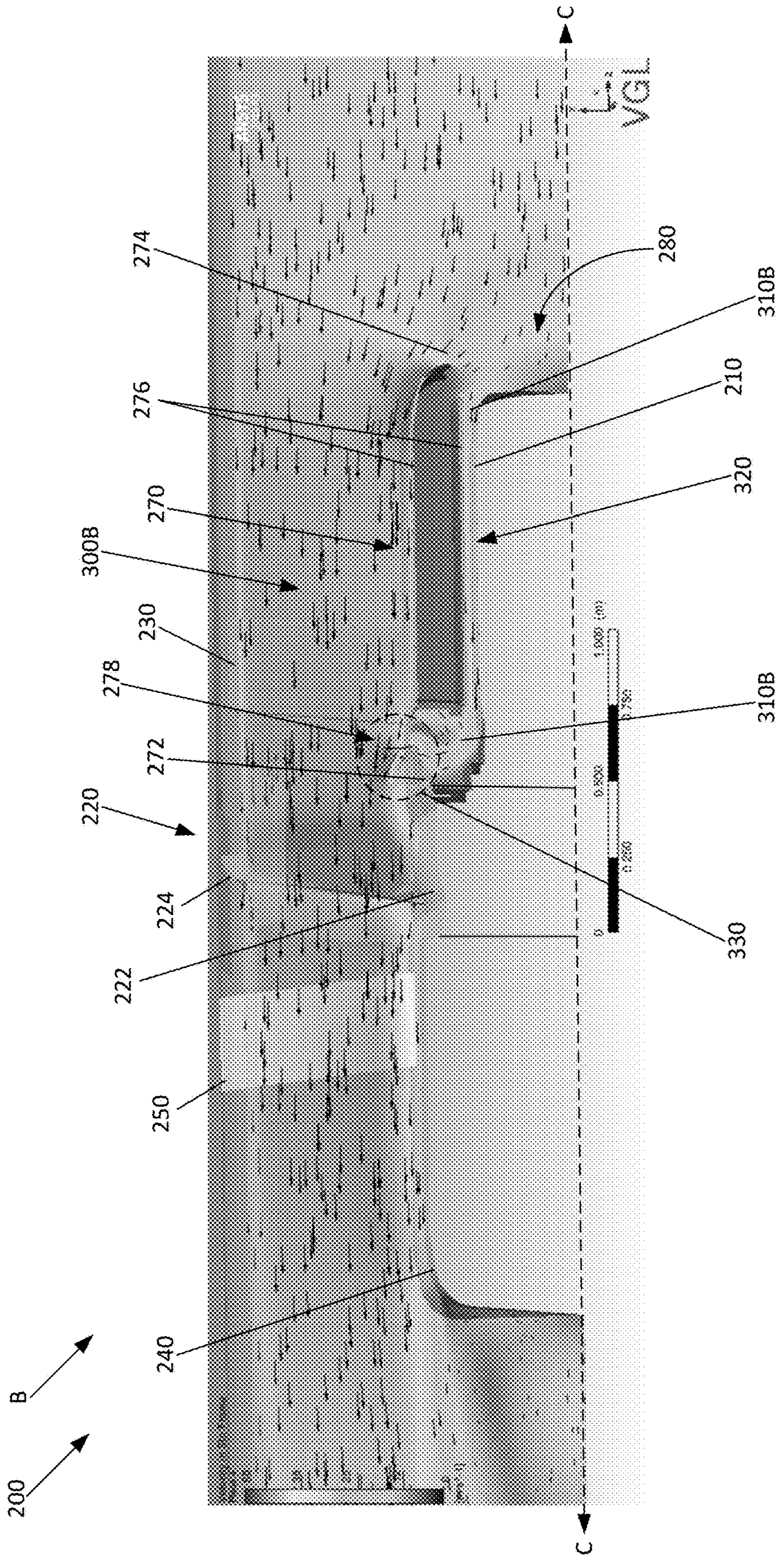
FIG. 4B PRIOR ART
FIG. 4B illustrates a computational fluid dynamics simulation of the flow of a fully reversible fan equipped with a TENV motor and a prior art motor cooling hood, the fully reversible fan operating in a reverse direction.

Turning to FIG. 3, and with continued reference to FIGS. 1 and 2, illustrated is an example of a prior art version of a conventional prior art motor hub 270 configured to fit over the TENV motor 110 of the unidirectional turbomachine 100 or the TENV motor 210 of the fully reversible turbomachine 200. The conventional prior art motor hub 270 is substantially cylindrical, and includes a first end 272 and an opposite second end 274. When installed on the fully reversible turbomachine 200, as illustrated in FIGS. 4A and 4B, the first end 272 is disposed proximate to the impeller 220 (i.e., more proximate than the second end 274). The conventional prior art motor hub 270 further includes a sidewall 276 spanning from the first end 272 to the second end 274, and includes a series of sidewall openings 278 in the sidewall 276 proximate to the first end 272. As further illustrated, the motor hub 270 also include a central opening 280 disposed in the second end 274. The series of sidewall openings 278 and the central opening 280 provide access to the interior of the prior art motor hub 270.

FIGS. 4A and 4B illustrate a computational fluid dynamics simulation of the fully reversible turbomachine 200 equipped with a conventional prior art motor hub 270. FIG. 4A illustrates the fully reversible turbomachine 200 operating in the forward operating direction, where the TENV motor 210 is causing the impeller 220 to rotate in the first rotational direction A. With the fully reversible turbomachine 200 operating in the forward operating direction, a main flow 300A is directed over the plurality of sidewall openings 278, over the sidewall 276 of the conventional prior art motor hub 270, past the stators 230, and is driven over the edge of the second end 274 of the prior art motor hub 270. As further illustrated in FIG. 4A, a cooling flow 310A enters the interior of the conventional prior art motor hub 270 through the central opening 280. The cooling flow 310A then flows across the TENV motor 210 along a cooling flow pathway 320 defined between the inner surface of the sidewall 276 and the outer surface of the TENV motor 210. The cooling flow 310A then flows out of the cooling flow pathway 320 through the plurality of sidewall openings 278, which are upstream of the stators 230 but downstream from the impeller 220. A pressure differential created by the static rise over the stators 230 and, in some cases, by a diffuser section at the end of the turbomachine and the subsequent expansion into the duct 260 is what drives the cooling flow 310A through the cooling flow pathway 320. The size of the central opening 280 in the conventional prior art motor hub 270 can be increased/decreased to vary the cooling flow 310A based on the TENV motor 210 supplier requirements. In addition, the restricted size (i.e., height) of the cooling flow pathway 320 reduces the volume of the cooling flow pathway, which maximizes the velocity of the cooling flow 310A across the TENV motor 210.

Conversely, FIG. 4B illustrates the fully reversible turbomachine 200 operating in the reverse operating direction, where the TENV motor 210 is causing the impeller 220 to rotate in the second rotational direction B. With the fully reversible turbomachine 200 operating in the reverse operating direction, the main flow 300B is pulled over the second end 274 of the conventional prior art motor hub 270, over the sidewall 276 of the conventional prior art motor hub 270, past the stators 230, and across the plurality of sidewall openings 278 prior to entering the impeller 220. As further illustrated in FIG. 4B, a cooling flow 310B is also pulled into the cooling flow pathway 320 via the central opening 280. The cooling flow 310B flows through the cooling flow pathway 320 in the same direction as that of the cooling flow 310A created when the fully reversible turbomachine 200 is operating in the forward operating direction. Thus, the cooling flow 310B flows through the cooling flow pathway 320, across the outer surface of the TENV motor 210, and out through the plurality of sidewall openings 278 that are located downstream of the stators 230 but upstream of the impeller 220 in the reverse operating direction. Because the pressure differential between the plurality of sidewall openings 278 and the central opening 280 is greater when the fully reversible turbomachine 200 is operating in the reverse operating direction than operating in the forward operating direction, the cooling flow 310B is driven at a higher velocity through the cooling flow pathway 320 than that of the cooling flow 310A. The higher velocity of the cooling flow 310B results in higher viscous losses in the cooling flow pathway 320. Moreover, because of the higher velocity of the cooling flow 310B and because the cooling flow 310B exits the cooling flow pathway 320 via the plurality of sidewall openings 278, the cooling flow 310B creates a maldistributed flow 330 into the impeller 220. This maldistributed flow 330 entering the impeller 220 combined with the viscous losses in the cooling flow pathway 320 greatly reduces the efficiency of the fully reversible turbomachine 200 operating in the reverse operating direction (i.e., when the impeller blades 224 rotate in the second rotational direction B).

Figure 5:
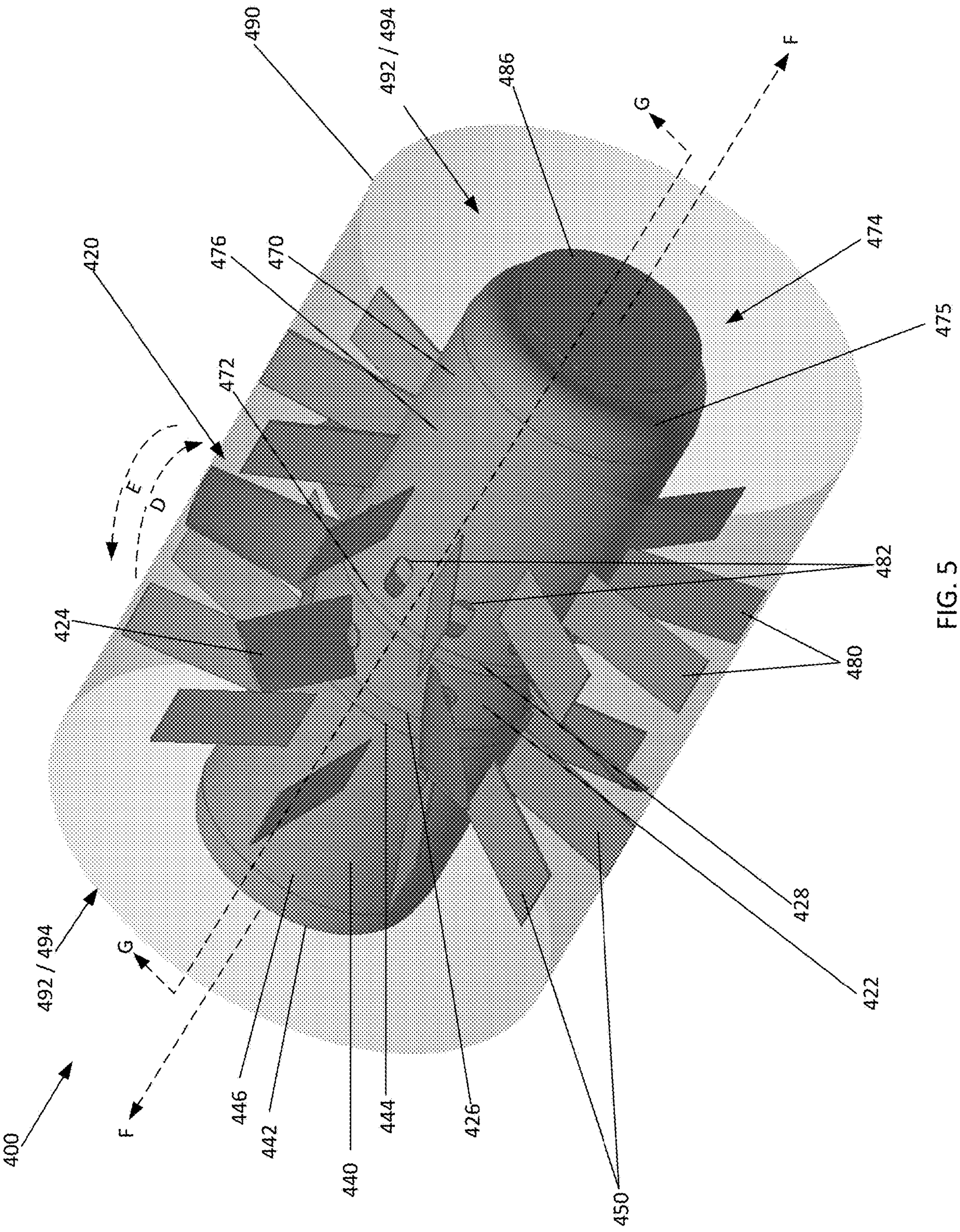
FIG. 5 illustrates a perspective view of a fully reversible fan that is equipped with a TENV motor and a motor cooling shroud in accordance with the present invention.
Figure 6A:
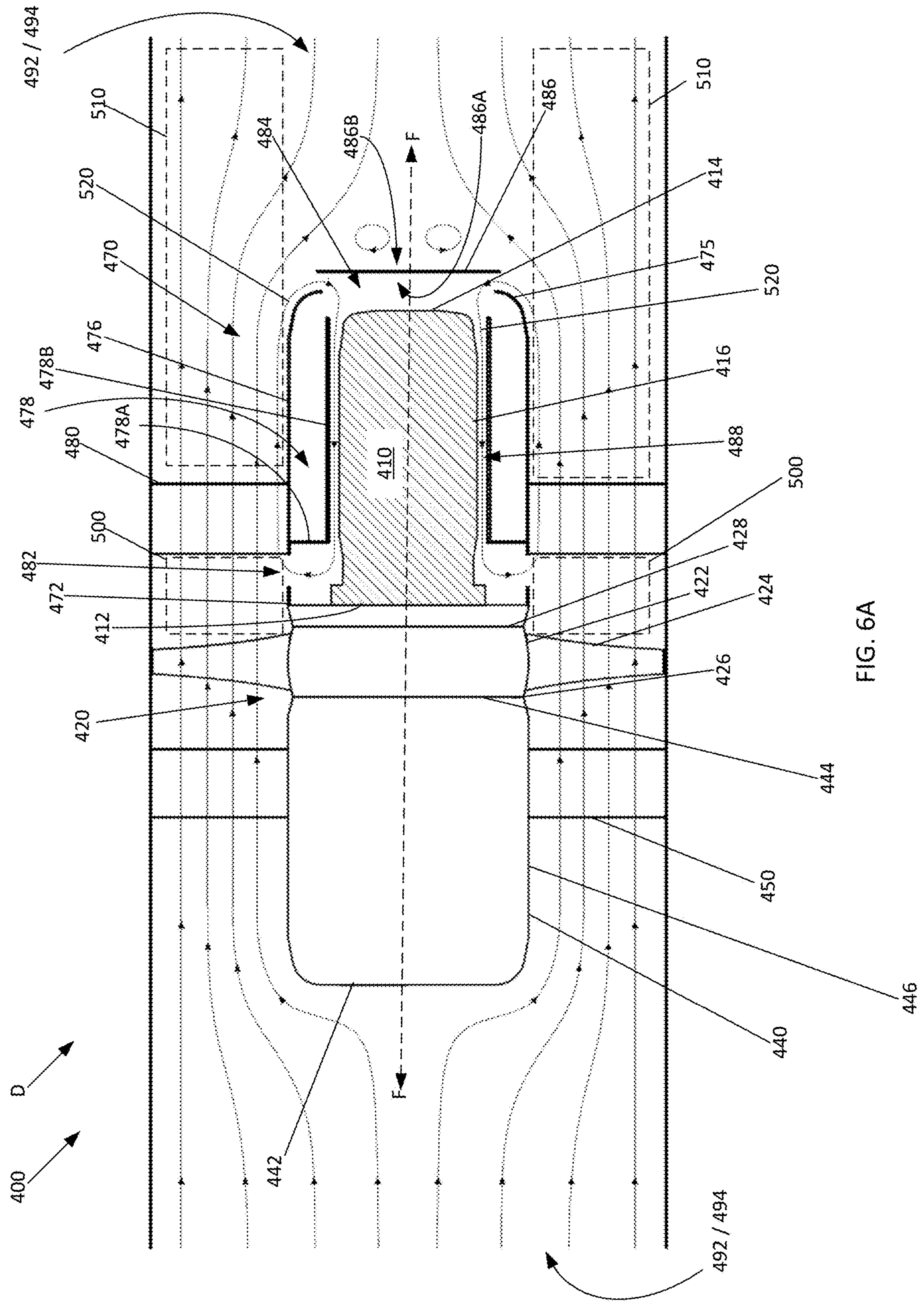
FIG. 6A illustrates a cross-sectional view of the fully reversible fan illustrated in FIG. 5 in a cascade, where the cross-section of the fully reversible fan is taken along line G-G in FIG. 5 and where the fully reversible fan is operating in a forward direction.
Figure 7A:
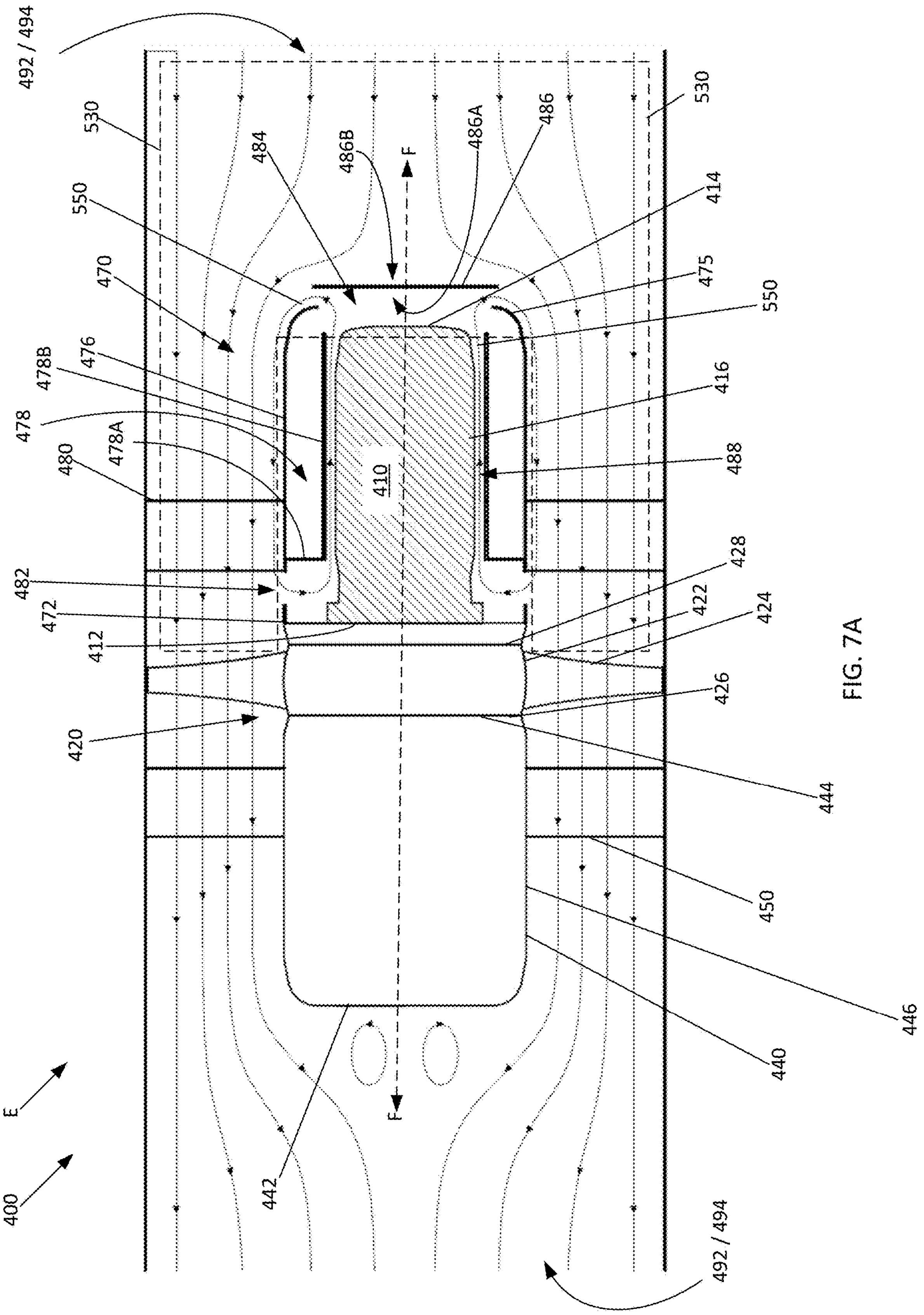
FIG. 7A illustrates a cross-sectional view of the fully reversible fan illustrated in FIG. 5 in a cascade, where the cross-section of the fully reversible fan is taken along line G-G in FIG. 5 and where the fully reversible fan is operating in a reverse direction.

Turning to FIGS. 5, 6A, and 7A, illustrated is a fully reversible turbomachine 400 equipped with a motor cooling shroud 470 that is configured to efficiently and effectively cool the TENV motor 410 of the fully reversible turbomachine 400 without adversely affecting the total efficiency of the fully reversible turbomachine 400 in either of the operating directions. The fully reversible turbomachine 400 illustrated in FIG. 4 contains a TENV motor 410 operatively coupled to an impeller 420 and configured to cause the impeller 420 to rotate in either a first rotational direction D (which is the forward operating direction configured to generate a flow in a forward or first direction in which the TENV motor 410 is downstream of the impeller 420) or a second direction E (which is the reverse operating direction configured to generate a flow in a reverse or second direction in which the TENV motor 410 is upstream of the impeller 420). As best illustrated in FIGS. 6A and 7A, the TENV motor 410 includes a first or forward end 412 and an opposite second or rearward end 414. The TENV motor 410 may further include an outer surface 416 that spans from the first end 412 to the second end 414.

The impeller 420 of the fully reversible turbomachine 400 may contain a central hub 422 and a series of impeller blades 424 extending radially outward from the central hub 422. The impeller 420 may further include a first or front side 426 and an opposite second or rear side 428. The impeller 420 may be configured to rotate in either the first rotational direction D or the second rotational direction E about central axis F. As illustrated, the first end 412 of the TENV motor 410 is disposed on the second side 428 of the impeller 420, and the TENV motor 410 has a diameter that is less than that of the impeller 420.

The fully reversible turbomachine 400 further includes a stationary hub 440 disposed on the first side 426 of the impeller 420. As illustrated, the stationary hub 440 may contain a first or front end 442 and an opposite second or rear end 444, where the second end 444 of the stationary hub 440 is disposed more proximate to the impeller 420 than the first end 442 of the stationary hub 440. The stationary hub 440 further includes a sidewall 446 spanning from the first end 442 to the second end 444 of the stationary hub 440, which gives the stationary hub 440 a substantially cylindrical shape. Moreover, the stationary hub 440 may contain a diameter approximately equal to that of the diameter of the impeller 420. As further illustrated in FIGS. 5, 6A, and 7A, a series of forward stators or guide vanes 450 may extend radially from the sidewall 446 of the stationary hub 440. The forward stators 450 may be configured to straighten a swirling or rotating flow generated by the impeller 420 when the fully reversible turbomachine 400 is operating in the reverse operating direction (e.g., the impeller 420 is rotating in the second rotational direction E), and may be configured to not impart a pre-swirl or pre-rotation to the flow entering the impeller 420 when the fully reversible turbomachine 400 is operating in the forward operating direction (e.g., the impeller 420 is rotating in the first rotational direction D).

As stated previously, the fully reversible turbomachine 400 includes a motor cooling shroud 470. The motor cooling shroud 470 may be substantially cylindrical with a first or front end 472, an opposite second or rear end 474, and a sidewall 476 spanning between the first and second ends 472, 474. The second end 474 of the motor cooling shroud 470 may include a curved outer edge 475. As further illustrated in FIGS. 6A and 7A, the motor cooling shroud 470 may further include an inner mantel 478 (collectively 478A and 478B) that may comprise of a first portion 478A extending radially inward from the inner surface of the sidewall 476 and a second portion 478B that extends substantially parallel to, but spaced from, the inner surface of the sidewall 476. The first portion 478A and the second portion 478B may collectively make up the inner mantel 478.

The motor cooling shroud 470 may further include a series of stators or guide vanes 480 extending radially outward from the sidewall 476. The series of stators 480 may be configured to straighten a swirling or rotating flow generated by the impeller 420 when the fully reversible turbomachine 400 is operating in the forward operating direction (e.g., the impeller 420 is rotating in the first rotational direction D), and may be configured to not impart a pre-swirl or pre-rotation to the flow entering the impeller 420 when the fully reversible turbomachine 400 is operating in the reverse operating direction (e.g., the impeller 420 is rotating in the second rotational direction E). As further illustrated, the sidewall 476 may further contain a plurality of sidewall openings 482 that are disposed more proximate to the first end 472 than the second end 474 such that the plurality of sidewall openings 482 are disposed between the first end 472 and the series of stators 480. The plurality of sidewall openings 482 may be spaced equidistantly from one another about the circumference of the motor cooling shroud 470, and may be disposed as close to the impeller 420 in the sidewall 476 of the motor cooling shroud 470 as the individual turbomachine layout will permit. As best illustrated in FIGS. 6A and 7A, the motor cooling shroud 470 also includes a central opening 484 that may be disposed within the second end 474 of the motor cooling shroud 470. The central opening 484 may be coaxial with the central axis F of the fully reversible turbomachine 400. The motor cooling shroud 470 may further comprise a plate 486 that is coupled to, but spaced from, the second end 474 of the motor cooling shroud 470. The plate 486 may have a circular planar structure (e.g., may be disc-shaped), and may be coaxially aligned with the central opening 484 and the fully reversible turbomachine 400 along central axis F. As illustrated, the plate 486 may include an inner surface 486A and an opposite outer surface 486B. The inner surface 486A of the plate 486 may be spaced from both the central opening 484 and the second end 474 of the motor cooling shroud 470.

As best illustrated in 6A and 7A, when the motor cooling shroud 470 is disposed around the motor 410 of the fully reversible turbomachine 400 (i.e., the motor cooling shroud 470 is installed on the fully reversible turbomachine 400, the fully reversible turbomachine 400 is equipped with the motor cooling shroud 470, etc.), the outer surface 416 of the TENV motor 410 collectively forms the cooling flow pathway 488 with the inner mantel 478 and/or the inner surface of the sidewall 476. The cooling flow pathway 488 fluidly connects the plurality of sidewall openings 482 with the central opening 484 of the motor cooling shroud 470.

FIGS. 5, 6A, 6B, 7A, and 7B further illustrates the fully reversible turbomachine 400 and motor cooling shroud 470 disposed within a duct or enclosure 490. As illustrated, the duct 490 includes a first or forward orifice 492 and an opposite second or rearward orifice 494. The first orifice 492 may be disposed upstream of the fully reversible turbomachine 400 and may serve as an inlet of the duct 490 when the fully reversible turbomachine 400 is operating in the forward operating direction (i.e., the impeller 420 is rotating in the first rotational direction D). It then follows that the second orifice 494 may be disposed downstream of the fully reversible turbomachine 400 and may serve as an outlet of the duct 490 when the fully reversible turbomachine 400 is operating in the forward operating direction (i.e., the impeller 420 is rotating in the first rotational direction D). Conversely, the first orifice 492 may be disposed downstream of the fully reversible turbomachine 400 and may serve as an outlet of the duct 490 when the fully reversible turbomachine 400 is operating in the rearward operating direction (i.e., the impeller 420 is rotating in the second rotational direction E). It further follows that the second orifice 494 may be disposed upstream of the fully reversible turbomachine 400 and may serve as an inlet of the duct 490 when the fully reversible turbomachine 400 is operating in the rearward operating direction (i.e., the impeller 420 is rotating in the first rotational direction E).

Figure 6B:
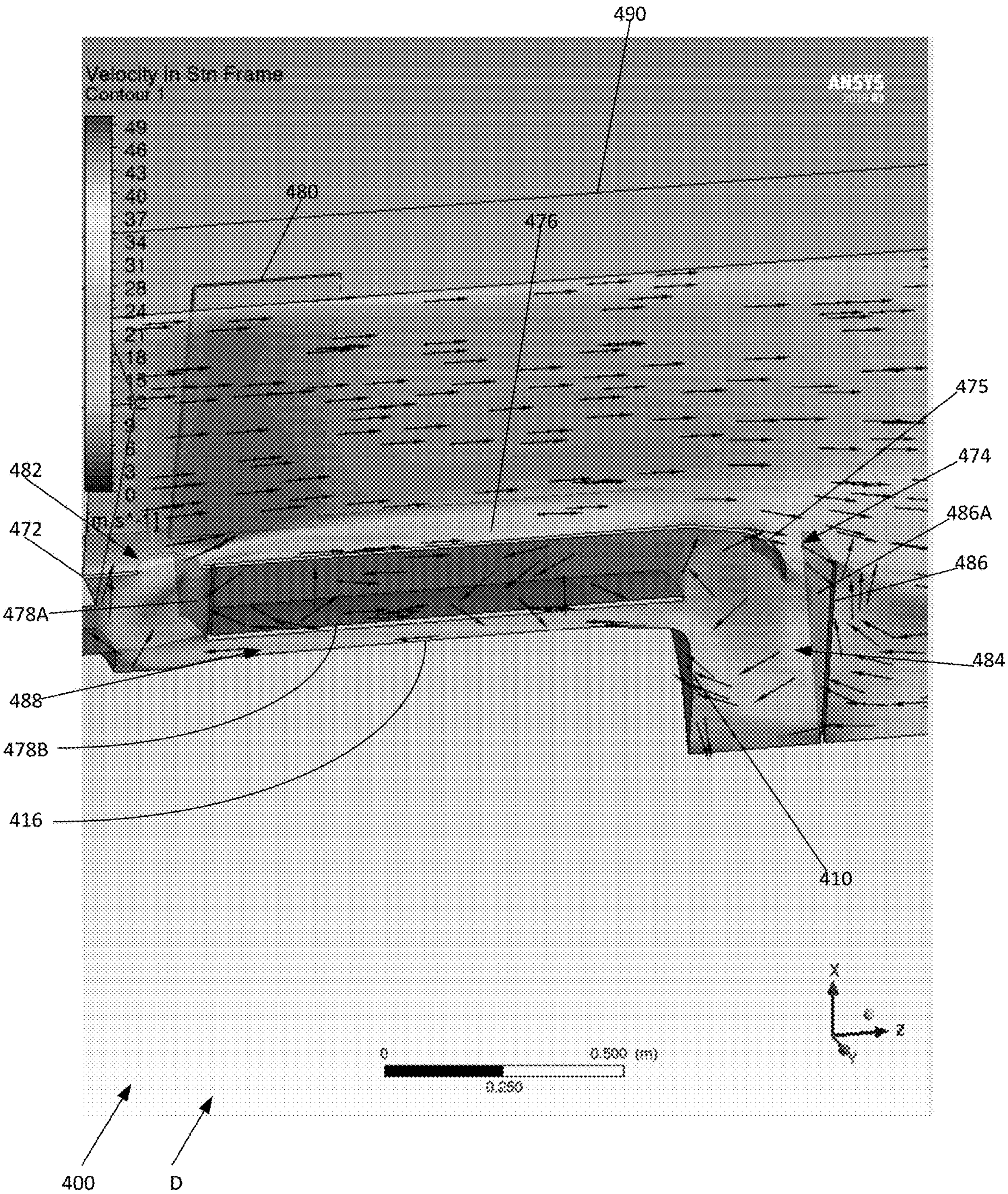
FIG. 6B illustrates a computational fluid dynamics simulation of the flow of the fully reversible fan illustrated in FIG. 5, the fully reversible fan operating in a forward direction.

Turning to FIGS. 6A and 6B, and with continued reference to FIG. 5, illustrated is the fully reversible turbomachine 400 operating in the forward operating direction (i.e., the TENV motor 410 is rotating the impeller 420 in the first rotational direction D). When operating in the forward operating direction, rotating or swirling flow 500 exits the impeller 420, which is lower in static pressure when compared to the main flow 510 located at the second orifice 494 of the duct 490. The plurality of sidewall openings 482 of the motor cooling shroud 470 are located on the motor cooling shroud 470 to make use of relatively lower static pressure to, as explained in further detail below, drive the cooling flow 520 through the cooling flow pathway 488. As further illustrated, the rotating flow 500 passes over the plurality of sidewall openings 482, and then passes over the stators 480 of the motor cooling shroud 470. As previously explained, the stators 480 are configured to straighten the rotating flow 500 into a non-rotational main flow 510. Straightening the rotating flow increases the static pressure. The straightened main flow 510 then passes over the curved edge 475 of the motor cooling shroud 470 and the plate 486, which serve as a diffusing section of the main flow 510 and slows the velocity of the main flow 510. Slowing the velocity of the main flow 510 converts dynamic pressure to static pressure (i.e., further increases the static pressure in the main flow 510). The combination of the pressure differential between the central opening 484 and the plurality of sidewall openings 482 (i.e., the pressure at the plurality of sidewall openings 482 being less than the pressure at the central opening 484) with the diffusing section (i.e., the plate 486 and the curved edge 475 at the second end 474 of the motor cooling shroud 470) draws a portion of the main flow 510 into the space between the second end 474 of the motor cooling shroud 470 and the plate 486, and, ultimately, into the central opening 484. In other words, the pressure differential and the diffusing section (i.e., the plate 486 and the curved edge 475 at the second end 474 of the motor cooling shroud 470) helps delay the boundary layer separation of the main flow 510 at the curved edge 475 of the second end 474 of the motor cooling shroud 470, which converts a portion of the main flow 510 into the cooling flow 520. The cooling flow 520 entering the central opening 484 is drawn along the cooling flow pathway 488 (i.e., between the TENV motor 410 and the inner mantel 478/inner surface of the sidewall 476 of the motor cooling shroud 470). The cooling flow exits the cooling flow pathway 488 via the plurality of sidewall openings 482, where the cooling flow 520 rejoins the rotating flow 500 and, ultimately, the main flow 510. The arrangement of the fully reversible turbomachine 400 equipped with the motor cooling shroud 470 increases the pressure rise of the flows 500, 510 by reducing the expansion loss that occurs from the main flow 510 exiting the second orifice 494 of the duct 490.

Figure 7B:
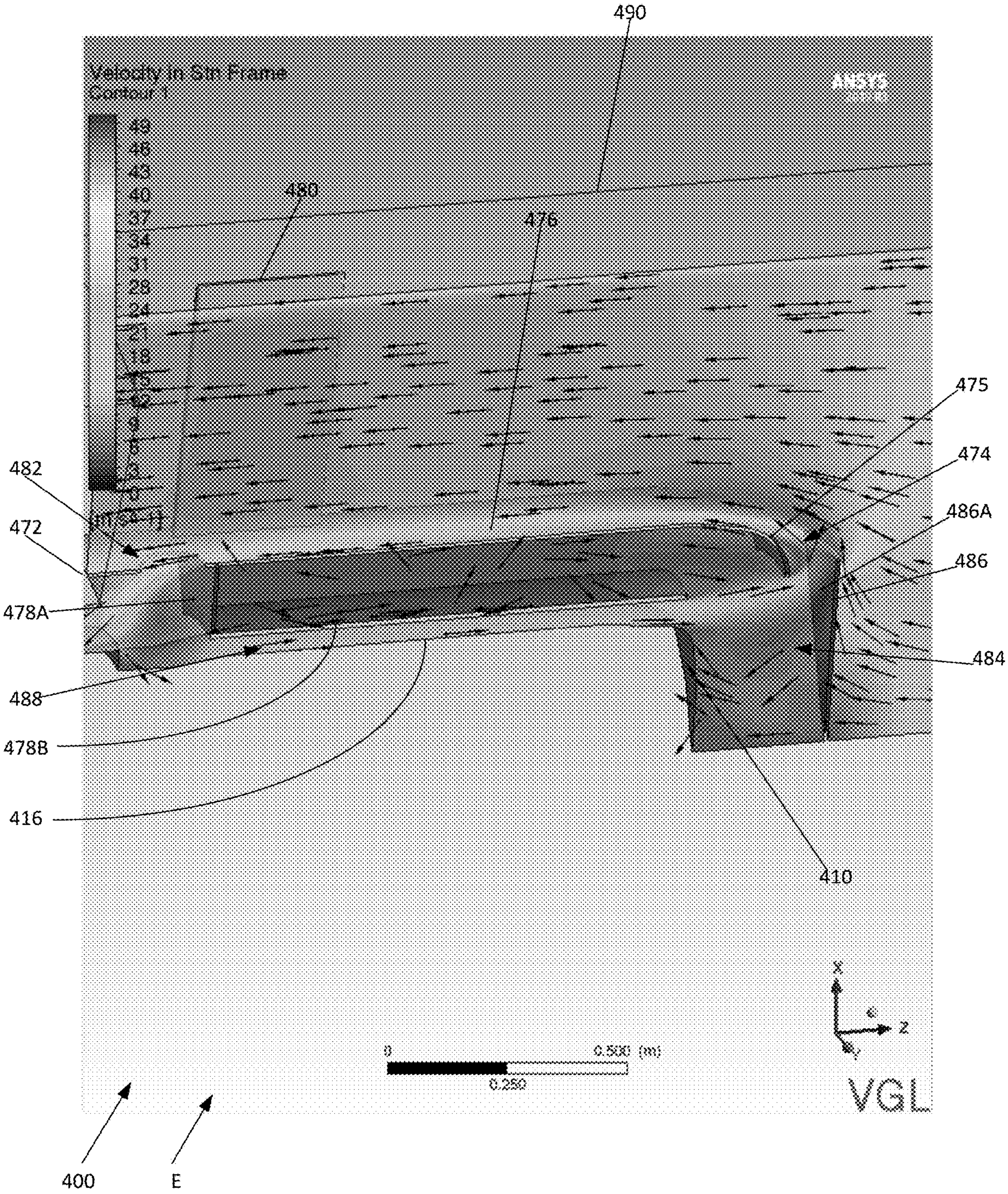
FIG. 7B illustrates a computational fluid dynamics simulation of the flow of the fully reversible fan illustrated in FIG. 5, the fully reversible fan operating in a reverse direction.

Turning to FIGS. 7A and 7B, and continued reference to FIG. 5, illustrated is the fully reversible turbomachine 400 operating in the reverse operating direction (i.e., the TENV motor 410 is rotating the impeller 420 in the second rotational direction E). When operating in the reverse operating direction, the main upstream flow 530 approaches the motor end (i.e., the second end 474 of the motor cooling shroud 470) of the fully reversible turbomachine 400 and accelerates over the plate 486. Accelerating the main upstream flow 530 over the plate 486 and the second end 474 of the motor cooling shroud 470 results in a highly localized increase in the velocity of the portion of the main upstream flow 530 disposed proximate to the curved edge 475 of the motor cooling shroud 470 (i.e., the diffusing section of the motor cooling shroud 470). This results in a relatively low static pressure proximate to the central opening 484 when compared to the static pressure of the portion of the main upstream flow 530 located proximate to the plurality of sidewall openings 482 and the impeller 420. The main upstream flow 530 eventually passes the stators 480 of the motor cooling shroud 470, where no static pressure rise occurs because there is no swirling or rotational component to the main upstream flow 530. Furthermore, when the main upstream flow 530 reaches the plurality of sidewall openings 482, the main upstream flow 530 has become more uniform with a lower velocity compared to that of the accelerated portion of the main upstream flow 530 located proximate to the central opening 484 and the curved edge 475 of the motor cooling shroud 470. This results in a higher static pressure of the main upstream flow 530 at the plurality of sidewall openings 482 when compared that at the central opening 484, which causes a portion of the main upstream flow 530 to be pulled into the plurality of sidewall openings 482 and convert into a cooling flow 550. The pressure differential between the plurality of sidewall openings 482 and the central opening 484 causes the cooling flow 550 to flow along the cooling flow pathway 488 (i.e., between the TENV motor 410 and the inner mantel 478/inner surface of the sidewall 476 of the motor cooling shroud 470). The cooling flow 550 exits the cooling flow pathway 488 via the central openings 484, and rejoins the main upstream flow 530 (i.e., at the diffusing section or at the general area of plate 486 and the curved edge 475 at the second end 474 of the motor cooling shroud 470).

Figure 8A:
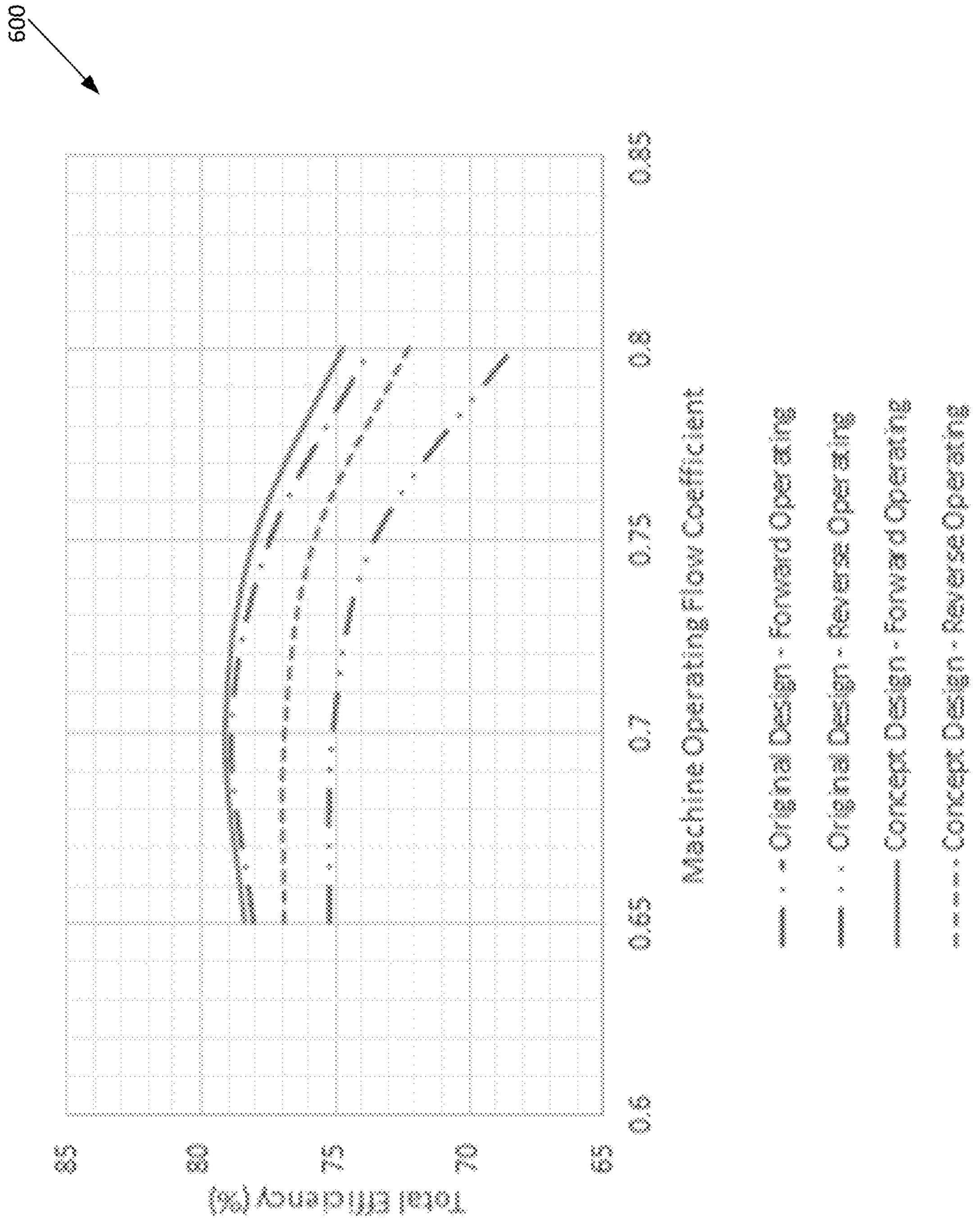
FIG. 8A illustrates a graph that presents the total efficiency (%) vs. a non-dimensional machine operating flow coefficient for the fully reversible fan equipped with the prior art motor cooling hood illustrated in FIGS. 4A and 4B and for the fully reversible fan equipped with the motor cooling shroud of the present invention that is illustrated in FIG. 5.

Equipping a fully reversible turbomachine 400 with the motor cooling shroud 470 depicted in FIGS. 5, 6A, 6B, 7A, and 7B enables the fully reversible turbomachine 400 to operate more efficiently in both the forward operating direction and the reverse operating direction than that of a fully reversible turbomachine unequipped with a motor cooling shroud or that of a fully reversible turbomachine equipped with the prior art motor hub 270. For example, when operating in the reverse operating direction, this design of the motor cooling shroud 470 helps to pull the main upstream flow 530 into the plurality of sidewall openings 482 rather than jetting out maldistributed flow 330 from the plurality of sidewall openings 482 (i.e., comparing the reverse operating direction computational fluid dynamics simulation of the prior art motor hub 270 illustrated in FIG. 4B with the reverse operating direction computational fluid dynamics simulation of the motor cooling shroud 470 illustrated in FIG. 7B). The removal of the maldistributed flow 330 improves the operating efficiency of the impeller 420 and reduces unsteady behavior of the fully reversible turbomachine 400. As depicted in the graph 600 illustrated in FIG. 8A, the total efficiency of the fully reversible turbomachine 400 equipped with the motor cooling shroud 470 improved over that of the fully reversible turbomachine 200 equipped with the prior art motor hub 270. More specifically, when comparing the computational fluid dynamics simulations for a range of analyzed flows of the fully reversible turbomachine 400 equipped with the motor cooling shroud 470 to that of the fully reversible turbomachine 200 equipped with the prior art motor hub 270, the total efficiency of the fully reversible turbomachine 400 equipped with the motor cooling shroud 470 is increased approximately 2% to approximately 3.5% between the minimum and maximum flows analyzed, respectively.

Figure 8B:
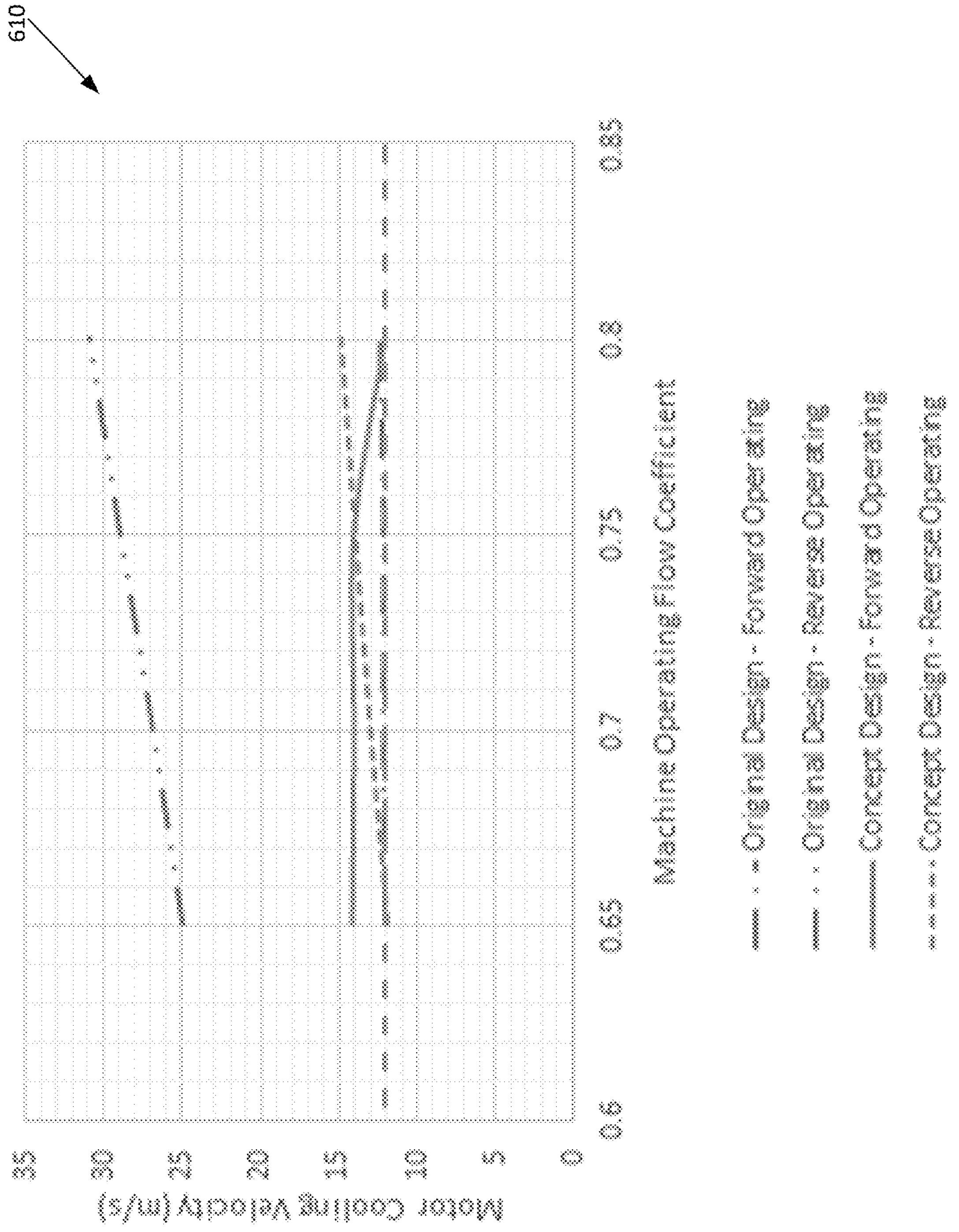
FIG. 8B illustrates a graph that presents the motor cooling velocity (m/s) vs. a non-dimensional machine operating flow coefficient for the fully reversible fan equipped with the prior art motor cooling hood illustrated in FIGS. 4A and 4B and for the fully reversible fan equipped with the motor cooling shroud of the present invention that is illustrated in FIG. 5.

In addition to improving the total efficiency of fully reversible turbomachines operating in the reverse operating direction, the design of the motor cooling shroud 470 decouples the control of the velocity of the cooling flow 550 in the reverse operating direction from the velocity of the cooling flow 520 in the forward operating direction. The graph 610 illustrated in FIG. 8B displays a comparison of the cooling flow velocities determined from the computational fluid dynamics simulations of FIGS. 4A, 4B, 6B, and 7B. As depicted in the graph 610 illustrated in FIG. 8B, because of the design of the prior art motor hub 270, when the fully reversible turbomachine 200 equipped with the prior art motor hub 270 is operating in the reverse operating direction (see FIG. 4B), the cooling flow 310B is driven at a higher velocity through the cooling flow pathway 320 than that of the cooling flow 310A present in when the fully reversible turbomachine 200 is operating in the forward operating direction. The greatly higher velocity of the cooling flow 310B results in higher viscous losses than that of the cooling flow 310A. As previously explained and shown in FIGS. 6B and 7B, and as further shown in the graph 610 illustrated in FIG. 8B, the velocity of the cooling flow 520 of the fully reversible turbomachine 400 equipped with the motor cooling shroud 470 and operating in the forward operating direction is substantially similar to the velocity of the cooling flow 550 of the fully reversible turbomachine 400 operating in the reverse operating direction. Thus, when comparing the cooling flow 310B of the motor hub 270 with the cooling flow 550 of the motor cooling shroud 470, the velocity of the cooling flow 550 is reduced to a more acceptable speed that results in minimized viscous losses without having to reduce the cooling flow 520 of the fully reversible turbomachine 400 operating in the forward operating direction. Thus, as illustrated in the graph 610 of FIG. 8B, the velocity of the cooling flow 550 of the fully reversible turbomachine 400 operating in the reverse operating direction is reduced to be approximately the same magnitude as the velocity of the cooling flow 520 of the fully reversible turbomachine 400 operating in the forward operating direction. In addition, for the motor cooling shroud 470, the velocity of the cooling flow 550 of the fully reversible turbomachine 400 operating in the reverse operating direction can be modified primarily by adjusting the size (e.g., diameter) of the plate 486, the spacing between the inner surface 486A of the plate 486 and the central opening 484, and/or the size of the central opening 484. Conversely, for the motor cooling shroud 470, the velocity of the cooling flow 520 of the fully reversible turbomachine 400 operating in the forward operating direction can be modified primarily by adjusting the size of the plurality of sidewall openings 482.

The motor cooling shroud 470, in comparison with the prior art motor hub 270, also provides additional benefits to fully reversible turbomachines when operating in the forward operating direction. More specifically, the main flow 510 of the fully reversible turbomachine 400 undergoes an additional diffusion in comparison to the flows of the fully reversible turbomachine 400 operating in the reverse operating direction. This is due to the main flow 510 being drawn into central opening 484 via the curved edge 475 and the plate 486 (e.g., the diffusing section), which delays the onset of separation of the main flow 510 from the motor cooling shroud 470. As previously explained and shown in the computational fluid dynamics simulation shown in FIG. 6B, the straightened main flow 510 (i.e., the rotating flow 500 is straightened as it passes over the stators 480) slows down over the diffusing section (i.e., the plate 486 and the curved edge 475 of the second end 474 of the motor cooling shroud 470), which converts dynamic pressure to static pressure. Because the pressure is lower at the plurality of sidewall openings 482 than at the central opening 484, a portion of the main flow 510 is pulled into the central opening 484 (i.e., the portion of the main flow 510 becomes the cooling flow 520), which helps to delay the boundary layer separation of the main flow 510 from the diffusing section (i.e., the plate 486 and the curved edge 475 of the second end 474 of the motor cooling shroud 470) of the motor cooling shroud 470. As further depicted in graph 600 shown in FIG. 8A, the extra diffusion of the main flow 510 helps to increase the overall efficiency of the fully reversible turbomachine 400 equipped with the motor cooling shroud 470 and operating in the forward operating direction when compared to the fully reversible turbomachine 200 equipped with the prior art motor hub 270 and operating in the forward operating direction.

While the apparatuses presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. For example, number of sidewall openings may be increased or decreased, the size of the sidewall openings and the central opening may be increased or decreased, the height of the cooling pathways may be increased or decreased, the size and shape of the plate, the spacing of the plate from the second end of the motor cooling shroud, etc. in order to optimize the cooling flow through the cooling flow pathway and the efficiency of the fully reversible turbomachine in both operating directions.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention. Additionally, it is also to be understood that the components of the motor cooling shroud and turbomachines described herein, or portions thereof may be fabricated from any suitable material or combination of materials, such as, but not limited to, plastics, metals (e.g., copper, bronze, aluminum, steel, etc.), wood, as well as derivatives thereof, and combinations thereof.

Finally, when used herein, the term "comprises" and its derivations (such as "comprising", etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about", "around", "generally", and "substantially."

What is claimed is:

1. A motor cooling shroud for a fully reversible turbomachine, the motor cooling shroud comprising:

a first end;

an opposite second end, the second end defining a central opening that is coaxial with a central axis of the fully reversible turbomachine;

a sidewall spanning from the first end to the second end, the sidewall being configured to encircle a motor of the fully reversible turbomachine;

a plurality of sidewall openings disposed in the sidewall proximate to the first end;

a plate coupled to the second end and spaced from the central opening; and a plurality of guide vanes extending from the sidewall of the motor cooling shroud at locations disposed between the plurality of sidewall openings and the central opening.

2. The motor cooling shroud according to claim 1, wherein the plate is disc-shaped.

3. The motor cooling shroud according to claim 1, wherein the motor of the fully reversible turbomachine is a totally enclosed non-ventilated motor.

4. The motor cooling shroud according to claim 1, wherein the second end contains a curved edge.

5. The motor cooling shroud according to claim 1, wherein, when the motor cooling shroud is disposed around the motor of the fully reversible turbomachine, one or more motor cooling pathways are defined between an outer surface of the motor and the sidewall of the motor cooling shroud.

6. The motor cooling shroud according to claim 5, wherein, when the fully reversible turbomachine operates in a forward direction, a first motor cooling flow generated by an impeller of the fully reversible turbomachine flows through the one or more motor cooling pathways in a first direction.

7. The motor cooling shroud according to claim 6, wherein, when the fully reversible turbomachine operates in a reverse direction, a second motor cooling flow generated by the impeller of the fully reversible turbomachine flows through the one or more motor cooling pathways in a second direction that is opposite of the first direction.

8. The motor cooling shroud according to claim 1, wherein the motor cooling shroud further comprises:

an interior mantel extending inwardly from the sidewall of the motor cooling shroud.

9. The motor cooling shroud according to claim 8, wherein a motor cooling pathway is defined between the interior mantel and an outer surface of the motor.

10. A fully reversible turbomachine comprising:

an impeller having a first side and an opposite second side;

a motor operatively coupled to the second side of the impeller, the motor being configured to rotate the impeller in a first rotational direction, which generates a forward flow by the fully reversible turbomachine where the motor is downstream from the impeller, and in a second rotational direction, which generates a reverse flow by the fully reversible turbomachine where the motor is upstream from the impeller; and a motor cooling shroud disposed over the motor, the motor cooling shroud and the motor defining a motor cooling pathway, wherein the motor rotating the impeller in the first rotational direction generates a first motor cooling flow that flows through the motor cooling pathway in a first flow direction, and the motor rotating the impeller in the second rotational direction generates a second motor cooling flow that flows through the motor cooling pathway in a second flow direction that is opposite of the first flow direction, and wherein the motor cooling shroud comprises:

a first end disposed proximate to the impeller;

a second end opposite the first end;

a plate coupled to the second end; and a central opening disposed within the second end of the motor cooling shroud.

11. The fully reversible turbomachine according to claim 10, wherein the motor cooling shroud is cylindrical and further comprises a sidewall extending between the first end and the second end.

12. The fully reversible turbomachine according to claim 11, wherein the motor cooling shroud further comprises:

a plurality of sidewall openings disposed within the sidewall proximate to the first end of the motor cooling shroud.

13. The fully reversible turbomachine according to claim 11, wherein the motor cooling shroud further comprises:

an interior mantel extending inwardly from the sidewall of the motor cooling shroud, the motor cooling pathway being further defined between the interior mantel and an outer surface of the motor.

14. The fully reversible turbomachine according to claim 10, wherein the plate is a disc-shaped plate having a first side surface that faces the second end of the motor cooling shroud and an opposite second side surface, the first side surface being spaced from the second end of the motor cooling shroud.

15. A motor cooling shroud for a fully reversible turbomachine, the motor cooling shroud comprising:

a first end;

an opposite second end, the second end defining a central opening that is coaxial with a central axis of the fully reversible turbomachine;

a sidewall spanning from the first end to the second end, the sidewall being configured to encircle a motor of the fully reversible turbomachine and collectively define a motor cooling pathway with an outer surface of the motor; and at least one sidewall opening disposed in the sidewall proximate to the first end, wherein, when the fully reversible turbomachine operates in a forward direction, the at least one sidewall opening serves as an outlet of the motor cooling pathway, and, when the fully reversible turbomachine operates in a reverse direction, the at least one sidewall opening serves as an inlet of the motor cooling pathway.

16. The motor cooling shroud according to claim 15, wherein the motor cooling shroud further comprises:

a disc-shaped plate coupled to the second end and spaced from the central opening.

17. The motor cooling shroud according to claim 16, wherein, when the fully reversible turbomachine operates in the forward direction, the central opening serves as the inlet of the motor cooling pathway.

18. The motor cooling shroud according to claim 17, wherein, when the fully reversible turbomachine operates in the reverse direction, the central opening serves as the outlet of the motor cooling pathway.

19. The motor cooling shroud according to claim 15, wherein the at least one sidewall opening is a plurality of sidewall openings that are disposed within the sidewall and spaced equally around the sidewall proximate to the first end of the motor cooling shroud.

20. The motor cooling shroud according to claim 15, wherein, when the motor cooling shroud is disposed on the fully reversible turbomachine such that the motor cooling shroud encircles the motor of the fully reversible turbomachine, the first end of the motor cooling shroud is disposed proximate to an impeller of the motor cooling shroud.

* * * * *